US 6,628,834 B2

(12) United States Patent
Gotsman et al.

(10) Patent No.: US 6,628,834 B2
(45) Date of Patent: Sep. 30, 2003

(54) TEMPLATE MATCHING SYSTEM FOR IMAGES

(75) Inventors: Craig Gotsman, Haifa (IL); Daniel Keren, Kiryat-Tivon (IL); Michael Elad, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/193,077

(22) Filed: Jul. 11, 2002

(65) Prior Publication Data

US 2003/0026485 A1 Feb. 6, 2003

Related U.S. Application Data

(62) Division of application No. 09/357,692, filed on Jul. 20, 1999, now Pat. No. 6,501,857.

(51) Int. Cl.[7] .................................................. G06K 9/62
(52) U.S. Cl. ........................ 382/209; 382/181; 382/197; 382/254; 382/278; 707/6
(58) Field of Search ......................... 382/103, 115–119, 382/155, 159, 173, 181, 197, 209, 217–220, 224, 254, 258, 276, 278, 305; 358/403; 348/169; 707/1–10

(56) References Cited

U.S. PATENT DOCUMENTS

| 5,390,285 A | * | 2/1995 | Wood ............................ 706/25 |
| 5,561,718 A | * | 10/1996 | Trew et al. .................. 382/118 |
| 5,710,833 A | * | 1/1998 | Moghaddam et al. ....... 382/228 |
| 5,802,207 A | * | 9/1998 | Huang ........................ 382/224 |
| 5,802,208 A | * | 9/1998 | Podilchuk et al. .......... 382/224 |
| RE36,041 E | * | 1/1999 | Turk et al. .................. 382/118 |
| 6,038,337 A | * | 3/2000 | Lawrence et al. .......... 382/156 |
| 6,385,340 B1 | * | 5/2002 | Wilson ........................ 382/218 |
| 6,421,463 B1 | * | 7/2002 | Poggio et al. ............... 382/224 |

OTHER PUBLICATIONS

Xuejun, et al. "On–line Recognition Handwritten Mathematical Symbols", IEEE, pp. 645–648, 1997.*
Chang, et al. "Ranging Through Gabor Logons–A Consistent, Hierarchical Approach", IEEE, pp. 827–843.*

* cited by examiner

Primary Examiner—Daniel G. Mariam
(74) Attorney, Agent, or Firm—Marc Schuyler

(57) ABSTRACT

This disclosure provides a system for classifying images, used in image detection, image recognition, or other computer vision. The system processes directory images to obtain eigenvectors and eigenvalues, and selects a set of "smooth" basis vectors formed by linear combinations of these eigenvectors to be applied against a target image. Contrary to conventional wisdom, however, a group of the eigenvectors having the weakest eigenvalues are used to select the basis vectors. A second process is then performed on this group of "weakest" eigenvectors to identify a set of candidate vectors, ordered in terms of "smoothness." The set of basis vectors (preferably 3–9) is then chosen from the candidate vectors in order of smoothness, which are then applied in an image detection or image recognition process. Unlike some conventional systems where "strong" directory presence and thresholds are used to detect possible matches, the present system uses smooth, weak vectors to ideally produce zero or near zero results for matches.

8 Claims, 6 Drawing Sheets

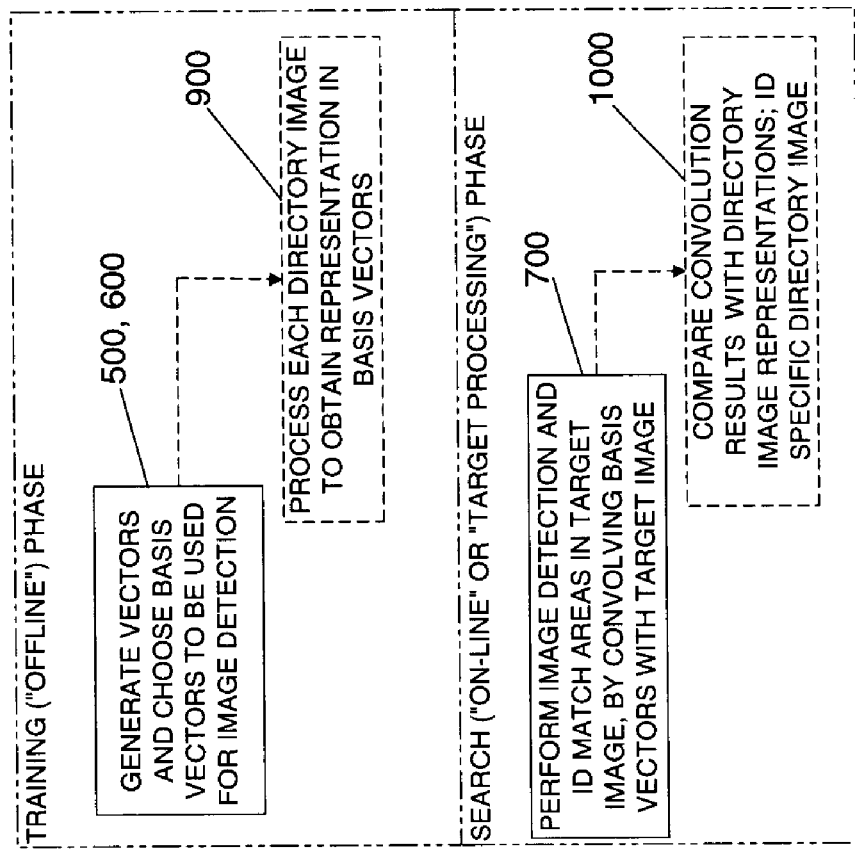
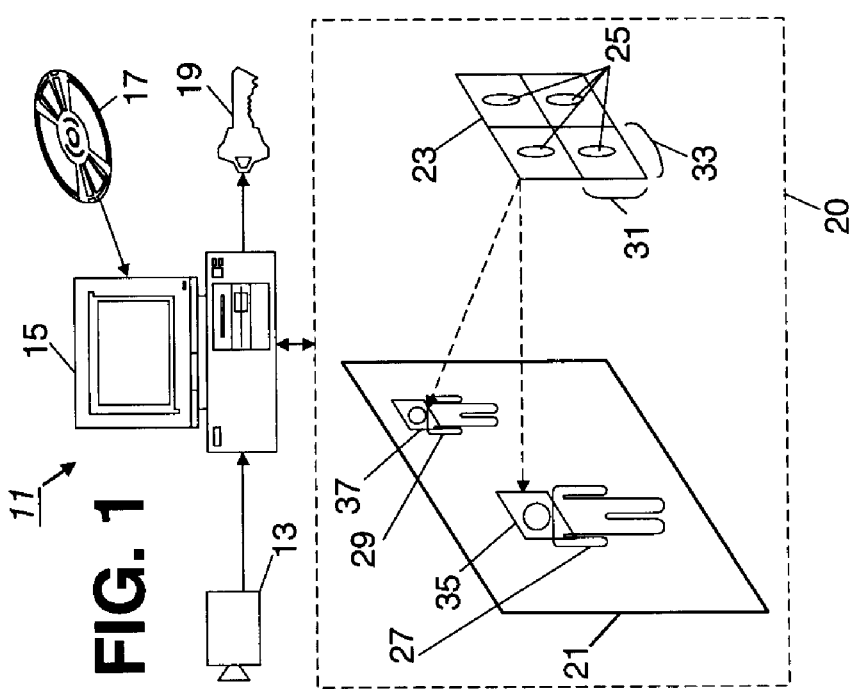

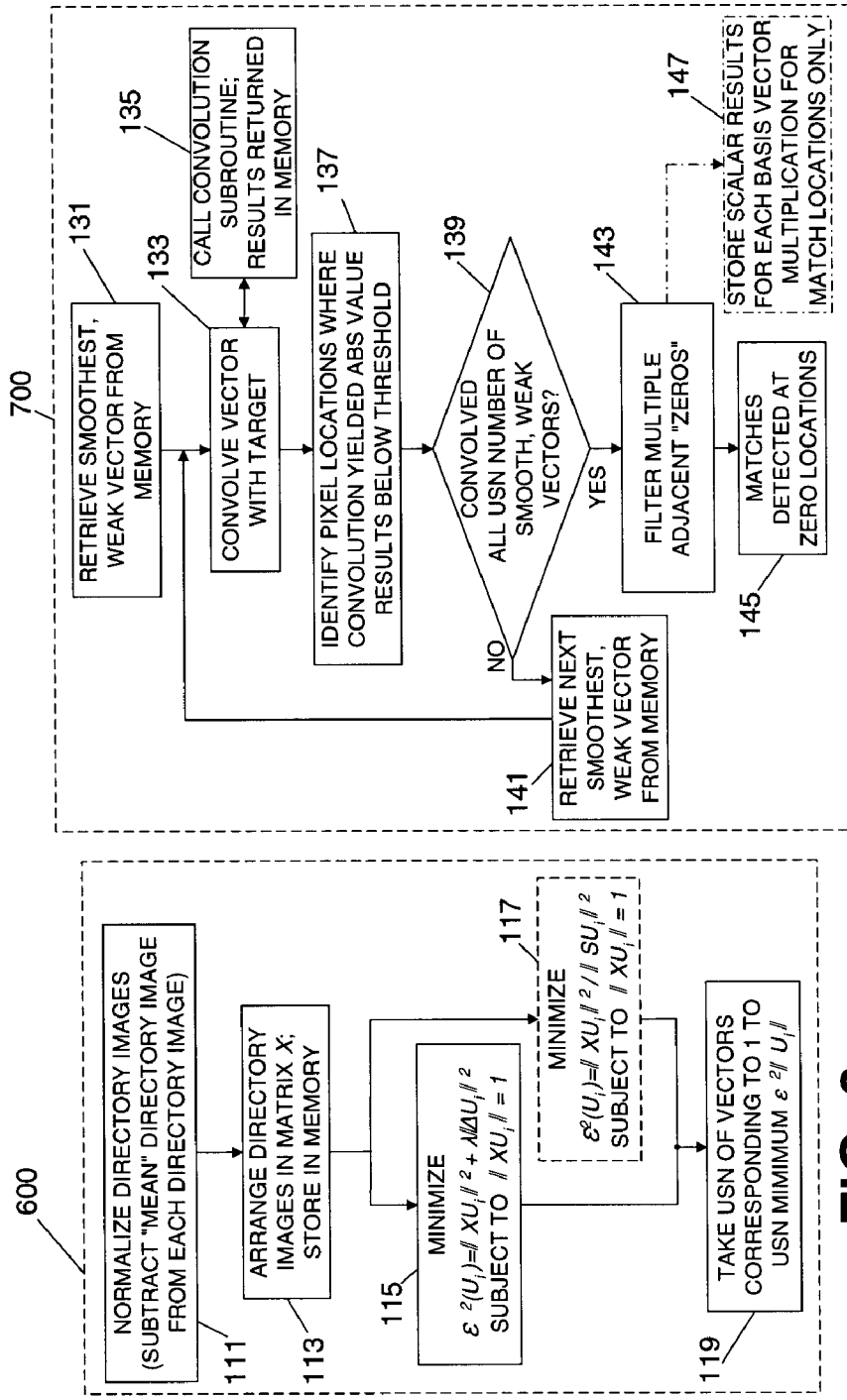

TEMPLATE MATCHING SYSTEM FOR IMAGES

CROSS REFERENCE TO RELATED APPLICATION(S);

This is a divisional of application Ser. No. 09/357,692 filed on Jul. 20, 1999, now U.S. Pat. No. 6,501,857 which is hereby incorporated by reference herein.

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

The present invention relates to image detection, image recognition and other types of computer vision. More particularly, the present invention provides a system with improved ability to classify objects in an image.

BACKGROUND

1. Image Recognition And Computer Vision In General

Image detection, image recognition and computer vision in general refer to abilities of electronic systems to detect the presence of predefined objects within an image and, if appropriate, to then take actions based upon that detection. Present day applications of these systems include fingerprint, hand or retina identification, identification of faces out of crowd photos or of types and numbers of enemy aircraft from a satellite photo, and similar applications. Some of these systems are "image detection" systems, while others can be "image recognitions" systems. An image detection system generally does not need to recognize a specific match, but just simply the fact that there is some sort of match; for example, an infrared fingerprint scanner used to open a door lock might simply determine whether a scanned fingerprint is present in a fingerprint directory, without determining exactly which fingerprint in the directory was matched. An image recognition system might go further, e.g., matching a fingerprint with a fingerprint of a specific criminal. These examples are illustrative only, and there are many applications of image detection, image recognition and computer vision.

The aforementioned systems usually require one or more "target" images, which can be acquired from a camera, infrared scanner, stored image, satellite or other source. In addition, these systems also generally require a directory (or database) of known images that a computer is to search for within a target image. The computer can use various methods to perform this searching, including intensity or feature based methods, among others. The computer can first pre-process the target image, to identify "candidate" portions which might contain a match with a directory image. If desired, the computer can then focus on the candidate portions and limit further processing to such portions only.

The processing required of the computer can become quite complex if the directory is large; for example, a typical directory might have several thousand images. Since a target image can feature distortions such as light variation, shading effects, perspective orientation and other circumstances that render detection and recognition difficult, the processes and time required of the computer can be enormous and perhaps too demanding for real-time processing. A common design goal, therefore, is to produce systems which perform very efficiently and are less computationally demanding.

2. Use Of Vectors In Image Recognition And Computer Vision

Systems typically use vectors to describe directory images; the vectors can represent individual features, or the vectors can describe other aspects of directory images. Each directory image is represented by a different combination of the vectors, and these systems generally use mathematical shortcuts whereby they can process the target image all at once, for all directory images (instead of searching the target image again and again, once for each directory image).

Some systems which use vectors in this manner use "eigenvectors." These vectors are derived from pre-processing of all the directory images, and they share the property that each eigenvector is independent from every other eigenvector. In this context, each eigenvector is simply a set of numbers, perhaps as many as four hundred numbers or more, one each for each pixel of the largest directory image. For example, if the directory had images that were each twenty pixels by twenty pixels, each directory image can be said to be represented by a vector having four hundred numbers. Eigenvectors would be derived in this instance by a computer subroutine which determines commonalities and difference between different images in the directory, with an eigenvector for each different dimension of image commonalities and differences; the eigenvectors would in this instance also have four hundred numbers and could also be thought of as a sort of building block image. A value related to each eigenvector is an eigenvalue, that is, a single value indicating how strong or significant the associated eigenvector is across all images of the directory. In a different vector system (where, for example, each vector could represent a feature of an image, e.g., a nose, an eye, etc.), an analogous value might be how important the associated feature is in describing the images in the directory.

A system might then use vectors (such as eigenvectors or other vectors) to perform image recognition and detection as appropriate. For example, the vectors might first be applied to a target image to select candidate portions, that is, objects in the image which are believe sufficiently "close" to the directory images so that a match is likely. To perform this processing, typically the strongest or most significant vector is multiplied against different groups of pixels in the target image; if the result is sufficiently large, a match is likely. Image portions screened in this manner can then have the second strongest vector applied, and so on, until it is very likely that screened portions are also found in the directory. If it is desired to perform image recognition (as opposed to just detection), a further pre-processing step exists where the contribution of each vector to a particular directory image is ascertained and stored, as a vector signature for the image. When processing a target image, the target is processed using the vectors and then it is ascertained whether results of processing match specific vector signatures. Many image recognition systems will use both of these processes; that is, a system might first process a target image to screen candidate portions of the target image, and then perform image recognition only for those candidate portions.

3. Shortcomings Of Some Vector Based Systems

One problem with some vector based systems is their tendency to detect false matches. That is to say, some systems will detect matches in a target image where the human eye, by contrast, can readily observe that there is no match. One reason this results occurs is that basis vectors are typically selected only for detecting a match, but usually not to reject false matches or for affinity to screen out non-matches. A related problem relates to vector multiplication, mentioned above, and the application of thresholds to the results to detect matches; strong or significant vectors multiplied against portions of the target can produce high values even though there truly is no "match," and a suitable threshold is needed to distinguish these results. However, the target image may be produced under different conditions, and thresholds can vary between target images and across portions of each target image. Thus, with some traditional systems, proper threshold selection is important and errors in a proper threshold can result in false matches or failure to detect a match.

What is needed is an image classification system, usable in image recognition and computer vision, which has an improved ability to quickly reject false matches. Ideally, such an image classification system should operate using a quick process (such as vector multiplication), but a process that usually produces large results, except for directory matches which produce zero or near zero results. Further still, such a system should ideally use a relatively small number of vectors, thereby requiring less processing. The present invention satisfies these needs and provides further, related advantages.

SUMMARY

The present invention solves the aforementioned needs by providing a system usable in image detection, image recognition and other types of computer vision. Unlike conventional systems where "basis" vectors used for detection are strongly correlated with images sought in a target, and large varying thresholds are used to detect matches, the present invention chooses vectors which are "anti-correlated" with directory images; that is to say, the preferred vectors are ideally strongly correlated with everything appearing in a target image except directory images, and are anti-correlated with directory images. In this manner, a system using the present invention has-improved ability to reject false matches and to detect true matches using near zero values, which reduces problems in selecting a proper threshold for each target image. The present invention generally requires fewer vectors for reliable image detection and recognition which, with improved false match rejection, provides for more efficient, faster image detection, image recognition and other computer vision.

A first form of the invention provides a method of classifying a target image or portion thereof using directory of image examples. This method processes images in the directory to derive a set of component vectors. A set of "basis" vectors is then chosen using these component vectors and applied to the target image to classify at least a portion of that image. This classification can be screening of the target image to identify candidate portions where a match is likely, or image detection or image recognition. To select the subset, the method performs an operation upon at least some vectors to determine their strength in the directory. The method also performs an operation upon at least some vectors to determine relative smoothness. The basis vectors are then chosen to include only "weak, smooth" vectors, which are then used to classify images.

In more particular aspects of this first form of the invention, the vectors can be eigenvectors which are specifically chosen to produce zero or near zero results when convolved with a match in the target image; in this manner, there is reduced difficulty in computing thresholds. Rather, the system simply identifies convolution results which are very close to zero, through several iterations if desired. The invention can be applied both to image detection systems and image recognition systems, or to other forms of computer vision.

A second form of the invention provides an improvement in template matching systems, wherein relatively "smooth, weak" vectors are used to classify images. A third form of the invention provides a method for classifying images where vectors are used which produce substantially zero results for matches only, and results which are substantially large (or negative) for other image portions.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 1 is an illustrative diagram used to explain a basic environment for an image recognition or image detection system; specifically, FIG. 1 shows a target image source (a video camera), a computer which processes a target image to determine whether any directory images (represented by the compact disk) are present, and a key which represents action taken by the computer. A dashed-line box below the computer symbolizes image matching performed by the computer.

FIG. 2 is a block diagram used to explain application of the preferred embodiment to image detection (solid line-blocks) as well as image recognition (both solid and dashed-line blocks). In particular, functions appearing in a topmost box represent computer processing during a "training" or "off-line" phase, to obtain "basis" vectors. By contrast, functions appearing in a bottommost box indicate processing performed during "search" or "on-line" phase. More detail on the four function blocks in FIG. 2 may be obtained from FIGS. 5 and 6 (which show preferred and alternative basis vector calculation) and FIGS. 7 and 9–10 (which show how the basis vectors may be applied).

FIG. 6 is a block diagram used to explain how basis vectors can be calculated, and represents an alternative implementation 600 of function block labeled 500, 600 from FIG. 2.

FIG. 7 is a block diagram used to explain how the preferred "smooth," "weak" basis vectors can be applied in image detection, and represents an implementation of function block 700 in FIG. 2.

FIG. 9 represents an implementation of the function block 900 of FIG. 2.

FIG. 10 is used to explain matching of a vector signature with target image processing, and represents an implementation of function block 1000 in FIG. 2.

DETAILED DESCRIPTION

Figure 4:
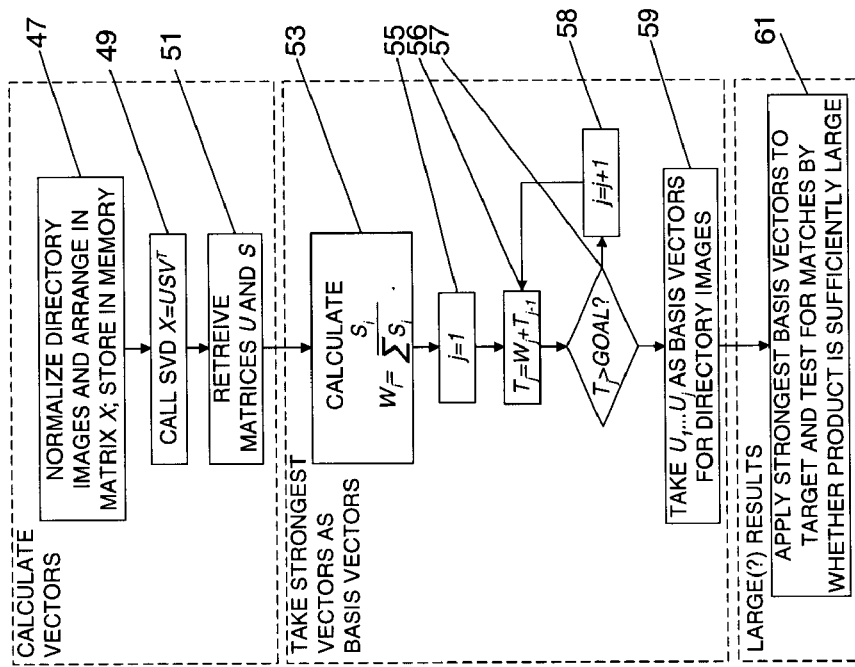
FIG. 4 is a block diagram used to explain basis vector calculation in a prior art eigenvector system. As indicated by FIG. 4, certain strongest eigenvectors are selected for target image processing.

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementation of mechanism that classifies an image using vectors, used in either image detection, image recognition or other types of computer vision. The invention, however, may also be applied to other types of systems as well.

I. Introduction To The Principal Parts

As depicted in FIG. 1, the preferred embodiment is a system 11 that classifies images, by receiving images from an image source 13 and by searching such "target" images to classify portions thereof. A computer 15 maintains a stored image database or directory 17, which may have as many as several thousand images that the computer is to search for within each target image; the computer classifies portions of the target image depending upon whether a match is found from the image directory 17. FIG. 1 also shows a key 19, which symbolizes actions taken or initiated by the computer in response to a match. The actions symbolized by the key 19 may include unlocking an electronic door in response to a fingerprint, hand or retina match, printing a close-up view of an airplane or criminal photo from a target image, and just about any other action desired in response to a match.

Beneath the computer 15, a dashed line box 20 is used to illustrate comparisons performed by the computer. For example, a target image 21 is seen at the box's left side to be a photo of two individuals 27 and 29. This example depicts a face matching application, and the computer compares a directory 23 illustrated as including only four images 25. Normally, a great many more images are stored in the image directory 23, and each directory image 25 is normally configured to be identical in size, having rows 31 and columns 33 of pixels. In this example, the computer might first process the target image 21 to determine that portions 35 and 37 (centered about each individual's face) are candidates for a match with a directory image, and the computer might then perform localized processing on these areas to determine whether in fact such a match with a specific example in the directory exists.

As will be further explained below, the present invention relates to the way that the selection of candidate matches are identified and also to the way in which matches are ultimately found. The present invention provides a way of calculating certain vectors to provide certain processing shortcuts. The certain vectors and the invention may be applied in different ways, such as (a) to process a target image to identify candidate portions (e.g., potential matches), (b) to process an image or portion thereof to detect an actual match with a directory image (e.g., "image detection" without necessarily determining specifically which directory image is matched), (c) to determine specifically which if any directory images are matched in a target (e.g., "image recognition"), and (d) to implement other computer vision processes. The preferred embodiment is a computer based system having software or firmware (these terms will be collectively referred to as "software") that selects these vectors and applies them to detect an actual match (without necessarily determining specifically which directory image is matched). If it is desired to further perform image recognition, one may use any conventional method for performing recognition techniques in conjunction with the preferred embodiment; alternatively, one may further employ the preferred image detection vectors to image recognition, and an embodiment supporting such use will be discussed further below.

In the preferred embodiment, each directory image should be assumed to be an image on the order of 20 to 40 pixels square (e.g., 400 to 1600 pixels, arranged in 20 to 40 rows and 20 to 40 columns), and each target image should be assumed to be a high resolution image, e.g., perhaps having well over a thousand rows and columns of pixels. As was mentioned earlier, one could separately take each directory image, compare it to every possible location in the target image, and then proceed to the next directory image and so on, but such processing would be exorbitant. The preferred embodiment avoids this extensive processing using select "basis" vectors, which are derived and applied during two different phases.

First, during a "training" or "off-line" phase, the computer processes the directory images to derive vectors that may be used in quickly processing all or part of the target image at once, using matrix multiplication; the computer generally does not process target images at this time, but rather, prepares for such processing by computing the vectors and selecting a limited subset of "basis" vectors, generally 3–9 vectors that are particularly good for processing. Once this subset of "basis" vectors has been computed and selected, the system is ready for the second phase.

During the second "on-line" or "search" phase, the computer receives one or more target images, which it processes to search for the presence of any directory image. The vectors are at this point used instead of the directory images themselves, to significant speed up processing. If appropriate, the computer can perform image detection or image recognition, taking any actions 19 as appropriate.

If it is alternatively desired to perform image recognition, then the first training phase usually involves a further step, which is to develop a "vector signature" for each directory image. Since vectors are used during the search phase to process the target image, the results of such processing may then be compared to stored signatures to recognize any and all directory images appearing in the target image.

These operations are variously illustrated in FIG. 2, which shows operations for both image detection and image recognition. The functions seen in solid lines and designated 500 and 700 are used for image detection only, as performed in the preferred embodiment. The function designated 500, 600 is broken down into further detail in FIG. 5 (preferred embodiment) and FIG. 6 (alternative embodiment), whereas the function designated 700 is broken down into further detail in FIG. 7. Additional functions connected to the functions 500 and 700 are seen in dashed lines, and represent image recognition processing steps. These latter functions are designated by reference numerals 900 and 1000 and are broken down into further detail in FIGS. 9 and 10, respectively.

With the principal elements of the preferred embodiment and one alternative embodiment thus introduced, use of the preferred method for calculating and selecting basis vectors and their use in image detection will now be further explained.

II. Image Detection With The Preferred Embodiment

Figure 3:
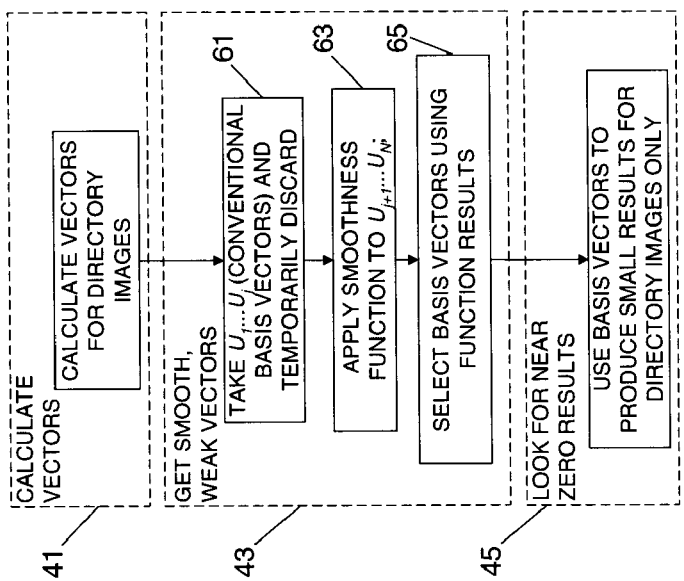
FIG. 3 is a block diagram used to explain the novel basis vector calculation provided by the preferred embodiment. In particular, the preferred embodiment during a training phase calculates vectors and selects smooth, weak vectors for use in processing. Subsequently, during a search phase, it applies to those vectors to a target image and looks for near zero results as an indicator of a possible match.

FIG. 3 is a block diagram which introduces basis vector calculation in the preferred embodiment. In particular, a first processing step 41 is used to calculate a relatively large group of vectors based upon the directory images. The vectors used could be any type, e.g., image features. However, as will be explained below, eigenvectors are preferably used and are mathematically derived by a computer running appropriate software. As indicated by a middle dashed line box 43 the preferred embodiment then proceeds to calculate a set of vectors which are both "smooth" and "weak." Functions of both of the first two dashed line boxes, 41 and 43, are performed during the training phase of the computer (that is, before any target image is used or is available). Finally, during the search phase when a target image is available, the computer uses the "basis vectors" to actually process the target image and ideally produce near zero results for matches, and otherwise results which are relatively large. This latter processing is represented by the bottom most dashed line box 45 of FIG. 3.

By "smooth," it is meant that some of the vectors will represent sharp image transitions, such as noticeable features and the like, while other vectors will represent only gentle transitions in image intensity. In this regard, a first step usually applied in calculating eigenvectors is to normalize the directory images by subtracting the average of all images from each and every image. Thus, each normalized directory image will usually include both positive and negative values. For high energy (or rough) vectors, there will tend to be both positive and negative values and, when applied to a target image, positive and negative values may tend to cancel for matches and non-matches alike; otherwise stated, if one is looking for "near zero" results only for matches, use of a "rough" vector might tend to produce undesirable results. Therefore, high energy vectors are preferably not used, and the preferred embodiment selects only smoothest vectors for use as basis vectors.

By "weak," it is meant that some vectors will be important or strong and tend to be present in most all directory images at least to some extent, while other vectors are weak and tend to be present in very few directory images. The weak vectors tend to represent the most minor differences in the directory images, e.g., background differences and the like, and these vectors are therefore used in the preferred embodiment as a measure of everything else in a target, other than a directory image match. Because eigenvectors are independent of one another, each weak eigenvector correlates poorly with directory images and will tend to produce a near zero result when multiplied against a directory image. [Importantly, each "vector" may be thought of as an image, and will consist of a number of values equal to the number of pixels in each directory image].

Smooth, weak vectors are selected (during the training phase) such that the preferred embodiment can (during the search phase) multiply selected vectors against portions of the target image, to produce near zero results only where there exists a true match with a directory image. That is to say, a goal of the preferred embodiment is to provide enhanced false image rejection by producing non-zero results for false matches, as implied by block 45.

FIG. 4 is a block diagram used to explain a conventional eigenvector processing method; as seen in FIG. 4, directory images are normally first normalized as indicated by function block 47 (e.g., by subtracting the mean image and storing the results in memory). The images are arranged in a matrix, with each directory image arranged as a different column in the matrix. A subroutine is then called, as indicated by function block 49, which instructs a computer's math coprocessor to retrieve and mathematically process the matrix to apply a "singular value decomposition" (SVD) function. When the subroutine is finished, as indicated by blocks 49 and 51, the memory contains three separate matrices, including a matrix of eigenvectors U, a matrix of eigenvalues S, one for each eigenvector indication how strongly the corresponding eigenvector is represented in the directory images, and a third transposed matrix V. This latter matrix V is not used for basis vector calculation.

Conventional eigenvector based systems sometimes also use only a subset of vectors to perform image detection, and this selected subset is normally composed of only the strongest eigenvectors. To select these strongest eigenvectors, systems might sum all eigenvalues together as indicated by function block 53, and use a loop (represented by functions 55–58) to convert each eigenvalue into a percentage value. The software selects vectors, beginning at the vector having the strongest percentage value and continuing until a number of strongest eigenvectors, generally where the selected subset cumulatively accounts for about ninety percent of eigenvalues, for use in processing a target image. These vectors will be denoted $U_{1-j}$, where it is presumed that there are a total of N eigenvectors which have been returned by the SVD function, and only j vectors are then used as the basis vectors, as indicated by function block 59. Finally as represented by block 61, conventional thinking would be to select a suitable (large) threshold and to process target images by multiplying the strongest eigenvector against those images, with a likely match being detected by sufficiently large results. A threshold must therefore usually be calculated in advance with ability to distinguish between a match and other objects or background in a target image.

Contrary to such conventional wisdom, and returning to FIG. 3, processing performed in the preferred embodiment is seen to select only smooth, weak vectors for use in processing a target image. FIG. 3 briefly introduces the specifics of this processing, with FIG. 5 providing a detailed explanation of the preferred methodology of computing basis vectors. FIG. 6 shows an alternative methodology according to the present invention for computing basis vectors.

As indicated in FIG. 3, contrary to conventional wisdom, the strongest eigenvectors are not used for detection, but preferably the weakest vectors, denoted $U_{j+1}$ to $U_N$, are selected in a first cut. This selection is designated by function block 61. In many applications, out of a set of what is often several hundred eigenvectors, a relatively small number of vectors (e.g., 100) will account for the vast majority (e.g., 90%) of all correlation, leaving several hundred or more remaining vectors. As indicated by function block 63, a second operation is then performed on these remaining unconventional eigenvectors to produce linear combinations of them, with the combinations ordered in terms relative smoothness. Only a handful (e.g., 3–9) of the smoothest vectors from this operation, as indicated by block 65, are selected for processing the target image.

A. Preferred Basis Vector Calculation

Figure 5:
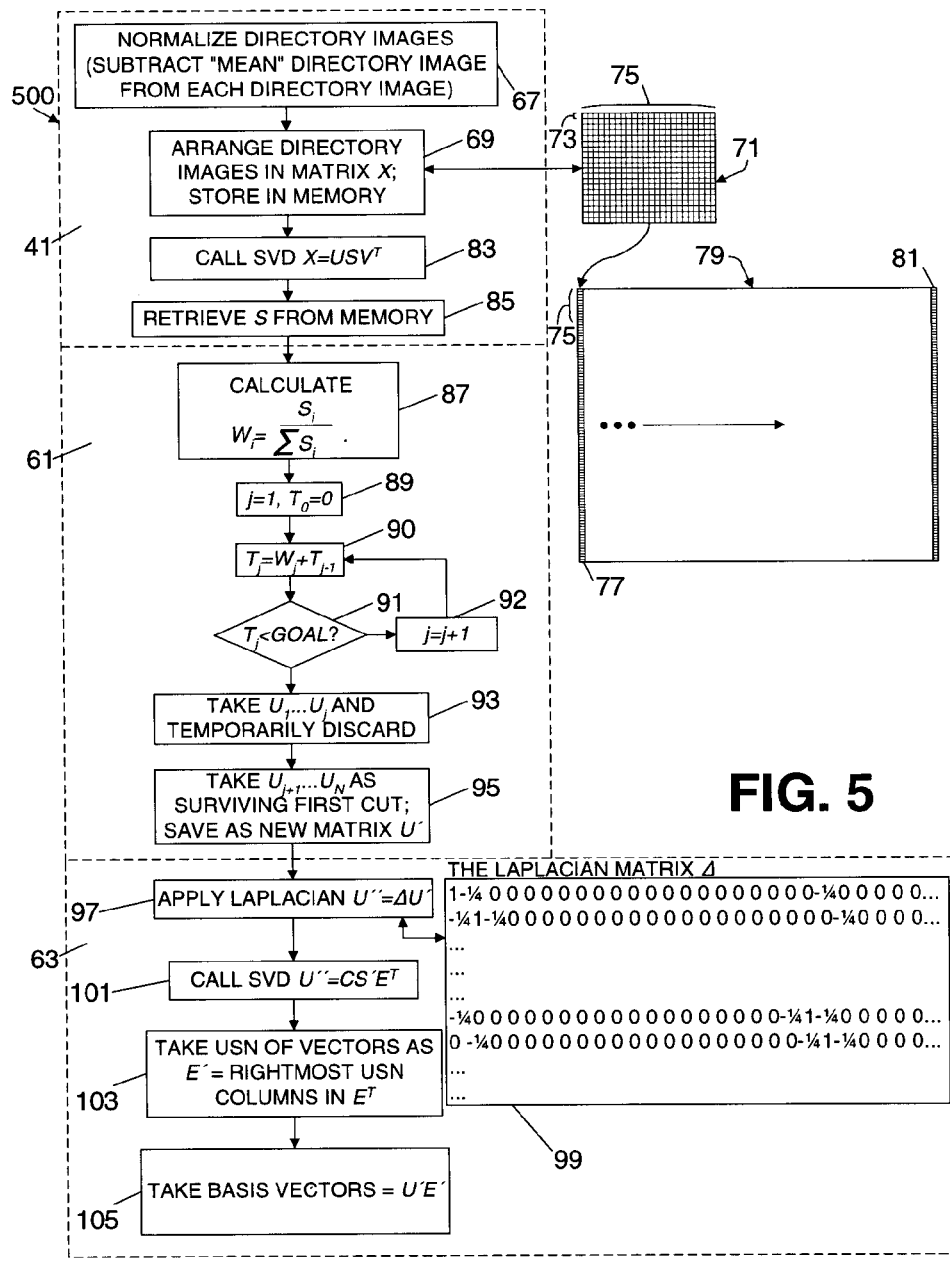
FIG. 5 is a block diagram used to explain how basis vectors can be calculated, and represents the preferred implementation 500 of function block 500, 600 from FIG. 2.

FIG. 5 provides more detail on the preferred calculation and selection of vectors, and is the preferred implementation 500 of the function block 500, 600 from FIG. 2. In particular, FIG. 5 shows three dashed line boxes which correspond to the processes indicated by numerals 41, 61 and 63 in FIG. 3.

In calculating eigenvectors, the directory images are first normalized in conventional fashion, as indicated by block 67. The normalized images are then arranged into a matrix format, as indicated by block 69. For example, as seen at the upper right side of FIG. 5, a first directory image 71 might consist of a twenty pixel-by-twenty pixel image, arranged in rows 73 that are twenty pixels wide, as further designated by reference numeral 75. The preferred embodiment takes each row, first to last, and orders the entire image into one column 77 having four hundred values. Each normalized directory image is processed in this manner as a subsequent column of an image matrix 79, until the last column 81 is arranged in this manner. A typical matrix might have four hundred rows (one for each pixel) with several thousand columns (one for each directory image). As would be conventional, the preferred system stores the matrix in memory, and calls a SVD subroutine to obtain matrices that will be used to select a subset of eigenvectors (as indicated by function block 83).

The preferred system selects basis vectors as indicated by function blocks 87, 89–92, 93 and 95. In particular, software uses the eigenvalues from the matrix S to assign a percentage contribution for each eigenvector $U_i$. The software then uses a user-supplied correlation number to exclude eigenvectors which strongly correlate with directory images. That is to say, a user of software provider empirically determines a percentage number that can be used to define a suitable "orthogonal linear subspace" of the directory images.

From a standpoint of mathematical theory, since eigenvectors are independent of one another, each eigenvector defines a different dimension of image space. In most applications of computer vision, e.g., face matching, most directory images will be strongly correlated with one another. In face matching, for example, each human face tends to look relatively alike compared to objects not resembling human faces. These directory images (the faces) tend to be closely clustered in image space, such that potential matches are screened by determining whether a portion of a target image is relatively close or far to the cluster of directory images in image space. In the preferred embodiment, an independent subspace is mathematically defined which includes ideally everything except directory images, and potential matches are detected using those portions of a target image which fall outside the subspace. The user-supplied number represents the size of the independent subspace relative to the dimensions for the directory images, and an optimal choice will vary from application to application; for example, given highly correlated images in a fingerprint matching application, and the fact that fingerprints might be placed in contact with a scanner to yield a good image, the user-supplied number could be extremely high, e.g., 99.9%. The preferred embodiment determines those eigenvectors responsible for this amount of correlation, and then it uses the remaining eigenvectors, e.g., those responsible for 0.1% of correlation. In practice, for a typical application, it is expected that the user-supplied number will exclude eigenvectors having 99% or more of the total eigenvalues for the directory images.

These remaining eigenvectors are designated $U_{j+1}$ to $U_N$ in FIG. 5, and they are formed into a second matrix U' as a result of this first operation to determine correlation. The matrix U' includes only relatively weak eigenvectors. In practice, if there are 2500 directory images and 2500 eigenvectors, a few hundred eigenvectors might be responsible for 99% correlation with the directory images, and consequently, the matrix U' might contain on the order of 2000 eigenvectors in this example. Importantly, the image directory should ideally contain a very large number of images (e.g., on the order of several hundred or several thousand), since for only a handful of images (and consequently for only a handful of eigenvectors), it might be impossible to obtain eigenvectors which very weakly correlate with the directory images.

As indicated by the box 63, the matrix U' is then processed to apply a function which produces results based on vectors in U'. This second operation includes applying a differentiating function, e.g., by multiplying the matrix U' by a second matrix, Laplacian matrix $\Delta$, as indicated by function block 97 in FIG. 5; the Laplacian matrix is illustrated by a box 99 which shows each row as weighting a current pixel by averaging its value with the mean value of its four neighbors. The Laplacian matrix is applied to eigenvectors, which with 20×20 pixel directory images, will have 400 numerical values. [As alluded to earlier, each eigenvector may also be thought of as an image building block or "eigenimage". The Laplacian matrix weights each pixel by subtracting the average of its row and column neighbors across each "eigenimage" to thereby emphasize "smoothness."] The result of this operation is a another matrix U", and a measure of smoothness is then applied by storing U" in memory and again calling the SVD subroutine (as indicated by function block 101). The set of basis vectors to be used in processing is determined by taking the product of several rightmost columns of the second SVD transpose matrix, $E^T$, and the first cut of eigenvectors, U', as indicated by blocks 103 and 105. The columns in the second SVD transpose matrix, $E^T$, are arranged in order of roughness, such that the rightmost columns are the smoothest; taking a number of columns equal to the desired number of basis vectors, and obtaining the product of the resultant matrix with the "weak" vectors exactly yields the desired "smooth," "weak" basis vectors used in the preferred embodiment.

The number of basis vectors to be used depends upon the particular application and equipment, and it is generally expected that a number of between three and nine basis vectors will be used; the number will be predefined in software for a particular application. For example, in some applications one vector might be sufficient, whereas in others, 13 or more basis vectors might conceivably be used. In general, use of too few basis vectors may tend to produce false matches, whereas use of too many basis vectors may tend to produce false rejections.

B. Alternatives For Calculating Basis Vectors

The method described above is not the only method that may be used for selecting basis vectors that will produce zero results when applied to a match in a target image. FIG. 6 shows two alternative implementations 600 of the function block 500, 600 from FIG. 2, where "weak" and "smooth"

vectors are also chosen, but where weak and smooth vectors are calculated at the same time via a single weighting function. In particular, directory images are first normalized and stored as a matrix in computer memory, as indicated by blocks 111 and 113. In a first alternative method 115, vectors which minimize the penalty function $$\epsilon^2(U)=\|XU\|^2+\lambda\|\Delta X\|^2,$$

are chosen as the basis vectors. The obtained vectors tend to be "weak" since the term $\|XU\|^2$ is minimized, and tend to be "smooth" since the term $\|\Delta X\|^2$ is minimized as well; the parameter $\lambda$ governs the weight between these two forces, which may be empirically chosen depending upon the application.

In implementing this function, all that is needed is to compute the matrix $(X'\cdot X+\lambda\Delta'\cdot\Delta)$, perform a SVD on this matrix [i.e., $U\cdot S\cdot V'=SVD(X'\cdot X+\lambda\Delta'\cdot\Delta)$], and chose vectors in the matrix U which correspond to the smallest singular values (e.g., the rightmost USN of vectors) as the selected basis vectors.

Basically stated, in the function block 115, a first generalized eigenvalue result $\|XU_i\|$ provides an indicator of correlation strength with directory images for each vector i, while a second term $\|\Delta U_i\|$ provides an indicator of non-smoothness; by weighting two terms together using the weighting function, software can effectively measure correlation weakness and smoothness at once. Importantly, the weighting function should be empirically determined and depend upon the particular application and equipment used. For example, in a given application with given hardware, weakness of correlation might be emphasized more or less in relation to image smoothness. In an application such as identifying images from a satellite photo, image smoothness might be more heavily weighted, and so on. It is believed that the best way of selecting a suitable weighting function is to test directory images against a target having known matches, and to determine which value of weighting function gives results which are the most correct.

The second alternative method 117 is similar. Vectors which minimize the following function are chosen as the selected basis vectors, $$\varepsilon^2(U)=\frac{\|XU\|^2}{\|SU\|^2},$$

where S is a low-pass filter representing the inverse of the delta matrix ($\Delta$) used in connection with function block 115. The obtained vectors tend to be "weak" since the term $\|XU\|^2$ is minimized, and tend to be "smooth" since the term $\|SU\|^2$ is maximized.

Minimizing the ratio indicated above is equivalent to solving the equation $$X'\cdot XU=c\cdot S'\cdot SU,$$

which is the well-known "Generalized Eigenvalue" problem; there are N possible solutions (where N is the dimension of U) of possible pairs $U_i$ and c (scalar value). The minimization solutions are the USN ones which correspond to the smallest values of the constant c. Numerical solvers for such systems of equations are well-known, having the complexity of a single SVD operation.

C. Detecting Matches In A Target

FIG. 7 indicates processing during the search phase in the preferred embodiment, and represents implementation of the function block 700 of FIG. 2. In particular, the preferred embodiment uses the basis vectors to detect matches in a target image. The number of basis vectors, as alluded to above, is determined in view of the particular application. For example, in a fingerprint matching application, fingerprints in an image directory will be highly correlated, and will be approximately the same size and general shape. Often, an infrared scanner used to provide target images will also be used to input directory images, and so, matching generally use highly correlated images. In such an application, it might be necessary to use only three basis vectors to achieve a high probability of match detection with high false match rejection. On the other hand, in an application where a target is simply screened to select target areas, it might be necessary to use only a single basis vector, and to perform conventional processing upon a candidate portion of a target only; in still other applications, particularly where size and orientation of a directory image might vary in a target, and where target image quality might vary, it might be necessary to use many more basis vectors, e.g., 9–13. It is well within the skill of one familiar with design of specific applications of computer vision to empirically determine the optimal number of basis vectors for a given system and a given application.

As seen in FIG. 7, the basis vectors are preferably stored in memory in order of smoothness. As indicated by function block 131, when a new target image is obtained, the preferred software first obtains the smoothest vector and convolves it with a target image. This processing is implemented as a convolution subroutine, indicated by function blocks 133 and 135, which returns in memory a number of scalar results, each effectively representing a multiplication between an eigenvector and a subset of the target image. The software then screens these scalar results, looking for zero or near zero results representing a smooth image (that is, it looks for several zeros or near zero values in a row); preferably, a threshold is empirically determined in advance and is used to screen the scalar values to detect candidate locations in the target image, as indicated by block 137. A suitable value for this threshold might be a value such as "4," but to reiterate, different applications and different equipment will almost certainly necessitate different thresholds which have to be empirically determined for the particular type of system; it is not expected that a threshold usable in matching aircraft from a satellite photo will be the same threshold used for photos from a different satellite, nor for retina scanners and other computer vision applications. A manufacturer of a given system, e.g., a fingerprint identification system, will most likely need to determine the threshold which yields the best detection results for that type of system and equipment.

As indicated by blocks 139 and 141, the software then retrieves the next smoothest vector and performs similar processing, but this time only for those "candidate" locations selected by the previous pass, and so on, until all basis vectors have been applied to an image. Once this has occurred, the software looks at all locations where zero or near-zero (i.e., "4" or less values) form a string, and it filters this string to determine whether the string represents one or more matches. Since the basis vectors are analogous to an "eigenimage" (i.e., they have a two-dimensional interpretation), this filtering operation accounts for consecutive zeros or near-zeroes as well as zeros or near-zeroes which represent the adjacent row or rows of pixels in the target image. This processing is designated by the reference numeral 143 in FIG. 7, and its result is the detection of matches at all locations which survived the filtering requirements, as indicated by block 145. Importantly, FIG. 7 also shows a dashed line block 147 which has one other optional step, used for image recognition; in this additional step, for each match location, the actual convolution results are stored for each basis vector as a string of scalars, from least smooth to smoothest basis vector, for comparison against a vector signature for a directory image. This comparison will be further explained below in connection with FIGS. 9 and 10.

III. Hardware For Image Detection Or Recognition

Figure 8:
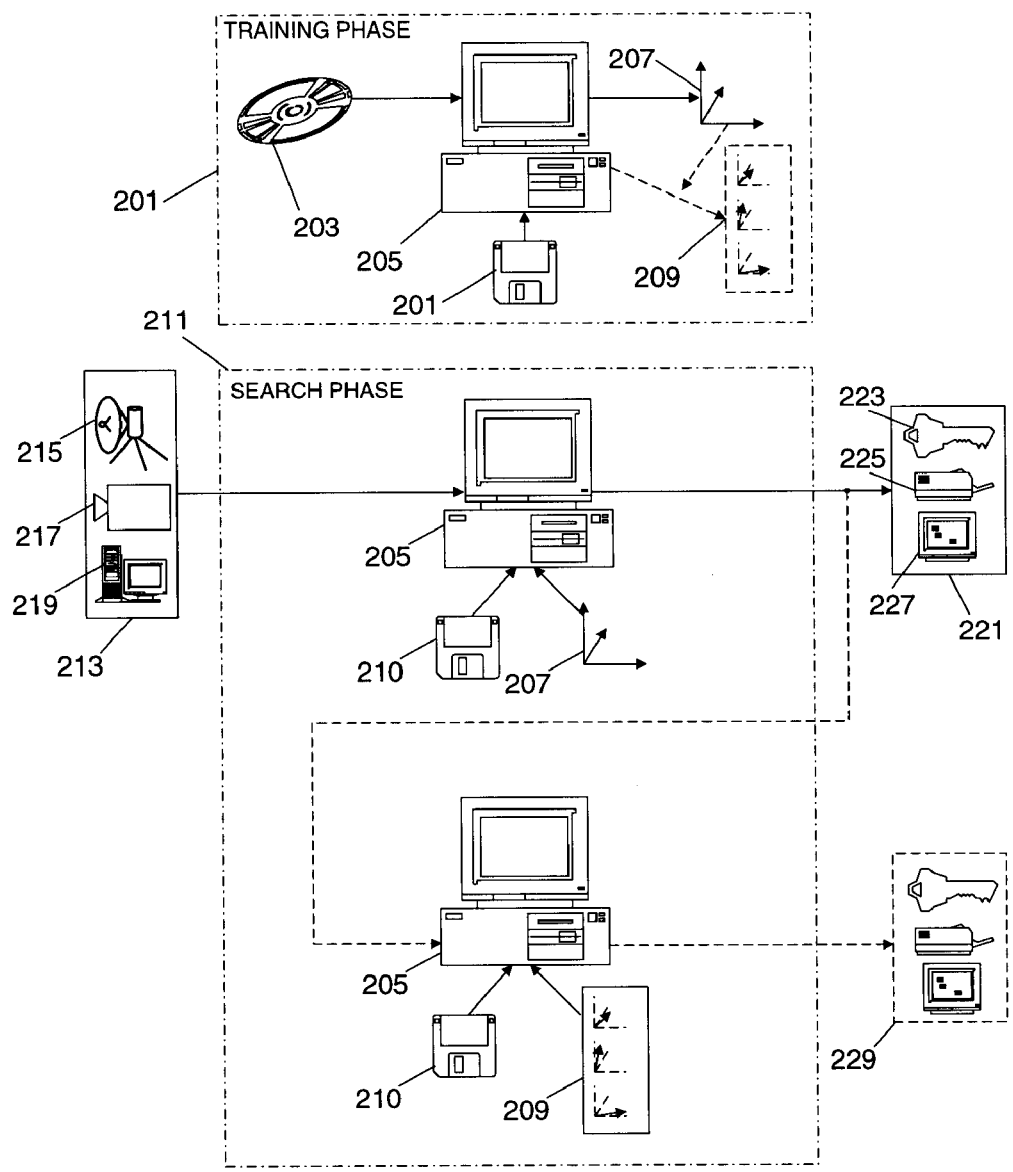
FIG. 8 is an illustrative diagram of hardware used in the preferred embodiment.

FIG. 8 is a diagram used to illustrate the layout of the preferred embodiment. In particular, FIG. 8 is parsed into two sections, to illustrate the use of hardware during the training and search phases.

A topmost box 201 shows of a CD ROM disk 203 which stores all directory images. This CD ROM disk can be supplied by a subscription service, for example, which periodically provides new disks containing new directory images which have been newly added to the system. Upon detecting presence of a new disk 203, a computer 205 automatically enters the training phase and produces a set of basis vectors, designated by a three-vector graphic 207 at the right of FIG. 8. If it is desired to also perform image recognition, the computer performs an additional step of deriving a vector signature for each directory image, which is designated in dashed lines 209 which show specific signatures mapped on to the three-vector graphic. Software which causes the computer 205 to perform this processing during the training phase is stored as instructions on machine readable media 210, which may be a floppy disk, another or the same CD ROM disk, or any other storage media.

The search phase is indicated by a bottommost box 211. In particular, a target image is received from a source 213 which can be a satellite 215, a camera 217, an Internet server 219 or some other image source. The computer uses instructions from the machine readable media 210 as well as the stored basis vectors (indicated by the graphic 207), and produces a set of results 221. The results may be an action, such as the unlocking of a door as indicated by a key 223, the printing of a report or close-up photo as indicated by a printer graphic 225, the display of an image as indicated by a monitor graphic 227, or some other type of computer action.

The bottommost box 211 also indicates processing performed by the computer in an image recognition system. In particular, with image matches detected, the computer 205 compares the vector signatures 209 obtained during the training phase with convolution results for image match locations, for each one of the basis vectors. The computer implements a distance algorithm, and if the convolution results for each match location are "close enough" to a directory image, the computer ascertains the specific directory image providing the most likely match and reports this match, as indicated by results block 229.

IV. Image Recognition With The Preferred Embodiment

Importantly, there are many ways of applying the preferred embodiment to image recognition. One could combine the preferred embodiment (used for image detection or screening) with a conventional recognition algorithm. Conventional recognition might be performed, for example, simply by measuring a projection (distance) of each directory image to a strongest eigenvectors, and matching each target image position to a known projection amount. Alternatively, one could apply the preferred "weak, smooth" basis vectors to image recognition, as will be described below with reference to FIGS. 9 and 10.

A. Image Recognition Using Preferred Basis Vectors

Figure 10:
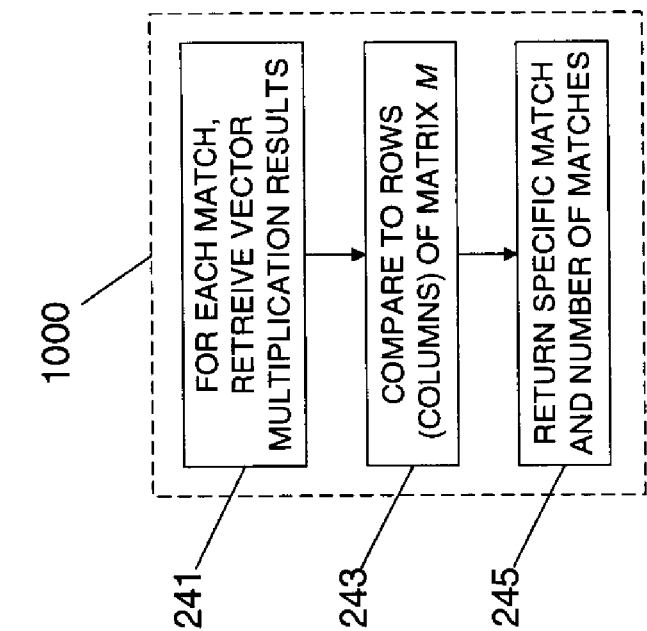
FIG. 10 is a block diagram used to explain how the preferred "smooth," "weak" basis vectors can also be used in an image recognition process; in particular.
Figure 9:
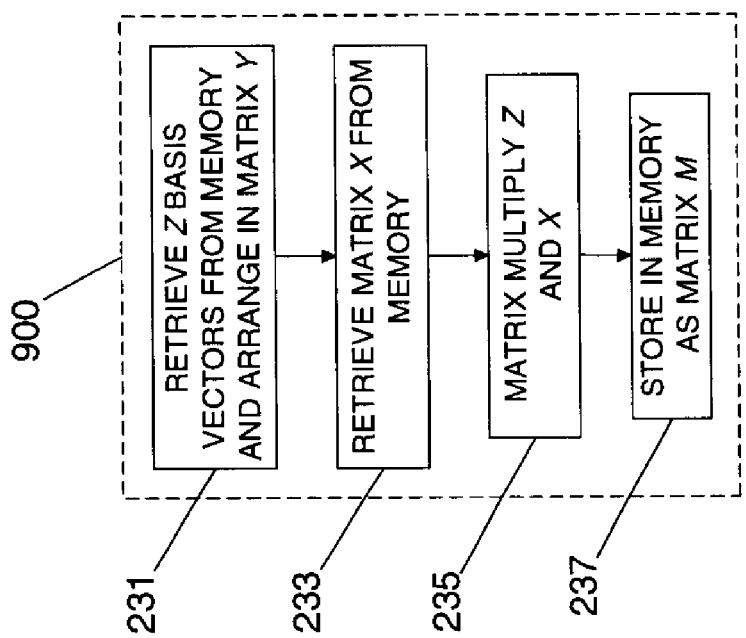
FIG. 9 is a block diagram used to explain how the preferred "smooth," "weak" basis vectors can also be used in an image recognition process, during a pre-processing or training phase, to develop vector signatures for each directory image.

FIGS. 9 and 10 respectively provide examples of how the functions 900 and 1000 from FIG. 2 may be implemented using the preferred basis vectors.

FIG. 9 in particular illustrates how the "vector signature" or projection of each directory image can be obtained. As indicated by function blocks 231, 233 and 235, all basis vectors are retrieved from memory and arranged in a matrix from smoothest to least smooth; this matrix is then multiplied against the matrix X which, it will be recalled, includes all directory images with each image arranged as a row (or alternatively, with each image arranged as a column). The results of this matrix multiplication is a matrix of values, all relatively close to zero, which indicate in row (or column) format the vector signature of each directory image. As indicated by function block 237, this matrix M is retained in memory for subsequent use during the search phase.

FIG. 10 illustrates search phase usage in three function blocks 241, 243 and 245. In particular, for each match location in a target image, the software retrieves the vector multiplication results from the optional step 147 (from FIG. 6) and searches for a close match to any vector signature, i.e., to any row or column of the matrix M. Implementation of a specific matching protocol is left to the skilled artisan for a particular application. For example, in a hypothetical face matching application, it might be desired to return a probability that a detected match represents several known criminals. The computer in such an application might apply criteria that defines a space about multiplication results, i.e., within "3" of any value with a sum of squares of all differences falling below a specific threshold. If multiple directory images meet this criteria, the computer could be called upon to rank all such images, e.g., 90% probability that criminal "A" is in a photo, 5% that criminal "B" is in the photo, and so on. Alternatively, it might be desired to detect a single, specific match, in which case the computer might be called upon to determine which directory image or images the multiplication results are "closest to" and then determine whether the sum of the squares of all differences falls below a specific threshold (in which case a match is verified). Selection of a suitable matching protocol is considered well within the skill of a computer programmer familiar with the particular type of system being designed and hardware being used.

Irrespective of the particular matching protocol used, the convolution results for a particular match location are recalled and compared to the matrix M to determine whether any specific matches are present. The software, as desired, identifies the specific match or matches for each match location identified as a result of the prior image detection process.

As can be seen from the foregoing description, the preferred embodiment may be used in image detection, image recognition and computer vision to efficiently perform processing using vectors to reduce computational processing that might otherwise be required. Using a relatively small subset of "weak, smooth" vectors, the preferred embodiment provides for enhanced false match rejection where results obtained are zero or near-zero for true matches only.

Importantly, those skilled in electronics or valve design will recognize that modifications may readily be performed to the embodiment stated above without departing from the principles of the present invention. For example, while the use of the particular smooth, weak vectors identified above offer certain advantages in terms of in terms of reduced processing, it may be possible to use other vector sets to produce results which are near zero only for true matches. It may be possible in some applications to use vectors which represent facial or image features as opposed to eigenvectors. These modifications are all within the scope of the present invention.

Having thus described several exemplary implementations of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

APPENDICES

The attached appendix 1 provides an exemplary program which accepts directory images ("faces") and calculates and selects basis vectors based on those images.

APPENDIX 1

```c
/ Program which accepts sub-images and builds templates */ include <stdio.h>
include <math.h>
#include "nrutil.h"
#include <string.h>
include <strings.h> define SIZE 32
define AREA 1024
#define TOTAL_FACES 75
#define NUM_FACES 60
#define NUM_TEMPLATES 2
define NUM_ROT 11 double y,z,a, v, S[AREA][AREA],w[AREA+1],sum1,sum,wmin;
int i,j,k,l,ll,index_min,x;
FILE *fp; float yy;
double u[SIZE][SIZE][10],nu[SIZE][SIZE],smoothness_u();
double lambda;
char stam[SIZE],stam1[SIZE],stam2[10000],stam3[4000];
double faces[NUM_ROT*TOTAL_FACES][AREA],inner[NUM_ROT*TOTAL_FACES];
double res_trained_faces, res_other_faces, res_inverted_faces;

main(ac,av)
char **av;
{
printf("Started\n");

print_image_u(2); exit(0);

res_trained_faces = res_other_faces = res_inverted_faces = 0.0;

lambda = (double)atof(av[1]);

a=(double **)malloc((1+AREA)*sizeof(double *));
v=(double **)malloc((1+AREA)*sizeof(double *));

for(i=0;i<(1+AREA);i++){
*(a+i) = (double *)malloc((1+AREA)*sizeof(double));
*(v+i) = (double *)malloc((1+AREA)*sizeof(double));
}
```

```c
for(i=0;i<(1+AREA);i++) for(j=0;j<(1+AREA);j++) a[i][j] = 0.0;

/* Read A-32, the smoothness operator matrix */ fp=fopen("A-32","r");

for(i = 0;i < AREA;i++) for(j = 0;j < AREA; j++) S[i][j] = 0.0;

while(fscanf(fp,"%d %d %f",&k,&l,&yy) != EOF){
S[k][l] = (double)yy;
} fclose(fp);

printf("Starting to read faces\n"); fflush(stdout);

/ Read sub-images */ for(i=0;i<TOTAL_FACES;i++){
  for(k=-20;k<=20;k=k+4){
strcpy(stam,"bigface");
gcvt((double)(i+1),3,stam1);
strcat(stam,stam1); strcat(stam,":");
gcvt((double)k,3,stam3); strcat(stam,stam3); printf("Opening %s\n",stam);
fflush(stdout);
fp=fopen(stam,"r");
fscanf(fp,"%s",stam2); fscanf(fp,"%d %d %d",&x,&y,&z);
for(j=0;j<AREA;j++) {
  fscanf(fp,"%d",&x); faces[i*NUM_ROT+ (k+20)/4][j] = (double)x;
}
fclose(fp);
 }} printf("Finished reading faces\n"); fflush(stdout);

printf("Starting faces faces transpose\n"); fflush(stdout);

printf("Lambda = %e\n",lambda); fflush(stdout);

/** Construct matrix a whose Singular Value Decomposition (SVD) gives
    the templates **/ for(i = 1;i < 1+AREA;i++)
for(j = 1;j < 1+AREA; j++){
```

```
sum = 0.0;

for(k=0;k<NUM_ROT*NUM_FACES;k++) sum = sum + faces[k][i-1]*faces[k][j-1];

a[i][j] = sum + lambda*S[i-1][j-1];
} printf("Finished faces faces transpose\n"); fflush(stdout);

printf("Starting SVD\n"); fflush(stdout);

/ Run SVD on a / svdcmp(a,AREA,AREA,w,v);

printf("Finished SVD\n"); fflush(stdout);

/ Select two eigenvectors with smallest eigenvalues as templates / wmin = 10000000.0;

for(i=1;i < 1+AREA;i++)
     if (w[i] < wmin){
        wmin = w[i];  index_min=i;
}
printf("Smallest Eigenvalue is %e\n\n",wmin);
for(i=0;i<AREA;i++) u[i/SIZE][i%SIZE][0] = v[i+1][index_min];
printf("\n\nSmoothness of first template is %e\n\n",smoothness_u(0));

w[index_min] = wmin = 10000000.0;

for(i=1;i < 1+AREA;i++)
     if (w[i] < wmin){
        wmin = w[i];  index_min=i;
}
printf("Second Smallest Eigenvalue is %e\n\n",wmin);
for(i=0;i<AREA;i++) u[i/SIZE][i%SIZE][1] = v[i+1][index_min];
printf("\n\nSmoothness of second template is %e\n\n",smoothness_u(1));

orthogonal_u(2);
print_image_u(0); print_image_u(1);
print_u();
}
```

```
/* Function which measures smoothness of template */ double smoothness_u(kk){
int i1,j1;
double sum = 0.0;

for(i1=0;i1<SIZE;i1++) for(j1=0;j1<SIZE;j1++) { if(i1>0 && i1<SIZE-1 && j1>0 && j1<SIZE-1)
  sum+=(4*u[i1][j1][kk]-u[i1-1][j1][kk]-u[i1+1][j1][kk]-u[i1][j1-1][kk]-u[i1][j1+1][kk])*
       (4*u[i1][j1][kk]-u[i1-1][j1][kk]-u[i1+1][j1][kk]-u[i1][j1-1][kk]-u[i1][j1+1][kk]);

else if(i1 == 0 && j1 == 0)
  sum+=4*(2*u[i1][j1][kk]-u[i1+1][j1][kk]-u[i1][j1+1][kk])*
       (2*u[i1][j1][kk]-u[i1+1][j1][kk]-u[i1][j1+1][kk]);

else if(i1 == 0 && j1 == SIZE-1)
  sum+=4*(2*u[i1][j1][kk]-u[i1+1][j1][kk]-u[i1][j1-1][kk])*
       (2*u[i1][j1][kk]-u[i1+1][j1][kk]-u[i1][j1-1][kk]);

else if(i1 == SIZE-1 && j1 == 0)
  sum+=4*(2*u[i1][j1][kk]-u[i1-1][j1][kk]-u[i1][j1+1][kk])*
       (2*u[i1][j1][kk]-u[i1-1][j1][kk]-u[i1][j1+1][kk]);

else if(i1 == SIZE-1 && j1 == SIZE-1)
  sum+=4*(2*u[i1][j1][kk]-u[i1-1][j1][kk]-u[i1][j1-1][kk])*
       (2*u[i1][j1][kk]-u[i1-1][j1][kk]-u[i1][j1-1][kk]);

else if(i1 == 0)
  sum+=1.7*(3*u[i1][j1][kk]-u[i1+1][j1][kk]-u[i1][j1-1][kk]-u[i1][j1+1][kk])*
       (3*u[i1][j1][kk]-u[i1+1][j1][kk]-u[i1][j1-1][kk]-u[i1][j1+1][kk]);

else if(j1 == 0)
  sum+=1.7*(3*u[i1][j1][kk]-u[i1-1][j1][kk]-u[i1+1][j1][kk]-u[i1][j1+1][kk])*
       (3*u[i1][j1][kk]-u[i1-1][j1][kk]-u[i1+1][j1][kk]-u[i1][j1+1][kk]);

else if(i1 == SIZE-1)
  sum+=1.7*(3*u[i1][j1][kk]-u[i1-1][j1][kk]-u[i1][j1-1][kk]-u[i1][j1+1][kk])*
       (3*u[i1][j1][kk]-u[i1-1][j1][kk]-u[i1][j1-1][kk]-u[i1][j1+1][kk]);

else if(j1 == SIZE-1)
  sum+=1.7*(3*u[i1][j1][kk]-u[i1-1][j1][kk]-u[i1+1][j1][kk]-u[i1][j1-1][kk])*
       (3*u[i1][j1][kk]-u[i1-1][j1][kk]-u[i1+1][j1][kk]-u[i1][j1-1][kk]);

}
return(sum);
```

}

/** Function which measures inner product of templates with sub-images:
    both sub-images used for training and "new" ones ***/

```
orthogonal_u(kk){
int i1,j1,k1; double sum,sum1;

for(i1=0;i1<NUM_ROT*TOTAL_FACES;i1++){
  sum = sum1 = 0.0;
  for(j1=0;j1<AREA;j1++){
    sum+= faces[i1][j1]*u[j1/SIZE][j1%SIZE][0];
    sum1+= faces[i1][j1]*u[j1/SIZE][j1%SIZE][1];
  }
  if(i1<NUM_ROT*NUM_FACES) res_trained_faces += fabs(sum);
  if(i1>NUM_ROT*NUM_FACES) res_other_faces += fabs(sum);

printf("Inner products with %d face are %e %e\n",i1,sum,sum1);
} printf("\nAverage reaction on trained faces is
%e\n",res_trained_faces/(NUM_ROT*NUM_FACES));
printf("\nAverage reaction on other faces is
%e\n",res_other_faces/(NUM_ROT*(TOTAL_FACES-NUM_FACES)));
}
```

/ Function which prints templates in image format */

```
print_image_u(kk)
{
int i1,j1; double x1,x2,x3,x4,min,max;
FILE *fp;
strcpy(stam,"TEMPLATE");
gcvt((double)kk,3,stam1);
strcat(stam,stam1);

printf("Trying to open %s\n",stam); fflush(stdout);

fp = fopen(stam,"w");
fprintf(fp,"%s\n","P2");
fprintf(fp,"%d %d\n",SIZE,SIZE);
fprintf(fp,"%d\n",255);

min = 1000.0;
for(i1=0;i1<SIZE;i1++)
```

```
  for(j1=0;j1<SIZE;j1++)
    if(u[i1][j1][kk] < min) min = u[i1][j1][kk];

for(i1=0;i1<SIZE;i1++)
  for(j1=0;j1<SIZE;j1++)
    u[i1][j1][kk] = u[i1][j1][kk] - min;

max = 0.0;

for(i1=0;i1<SIZE;i1++)
  for(j1=0;j1<SIZE;j1++)
    if(max < u[i1][j1][kk]) max = u[i1][j1][kk];

for(i1=0;i1<SIZE;i1++)
  for(j1=0;j1<SIZE;j1++){
    fprintf(fp,"%3d ",(int)(u[i1][j1][kk]*254/max));
    if(j1%5 == 0) fprintf(fp,"\n");
  }}

/* Function which prints templates in raw format */ print_u(kk){
int i1,j1;

for(i1=0;i1<SIZE;i1++)
  for(j1=0;j1<SIZE;j1++)
    printf("%10.5f\n",(float)u[i1][j1][kk]);
}
```

Copyright 1997 (unpublished) Hewlett Packard Company
All Rights Reserved

What is claimed is:

1. In a template matching system having both a training phase, in which a directory of image examples is processed by a digital computer to derive component vectors, as well as a search phase, in which a digital computer processes a target image with vectors selected using component vectors to thereby determine presence of one or more image examples in the target image, an improvement comprising:

identifying component vectors which most negatively correlate with the directory of image examples;

applying a function to component vectors to yield a result from which relative smoothness of vectors in a set can be determined;

selecting a subset of the vectors in the set for processing the target image, the subset including only relatively smooth vectors which relatively negatively correlate with the directory of image examples.

2. An improvement according to claim 1, further comprising using during the search phase substantially only the subset to perform detection of possible match regions between the target image and the image examples.

3. An improvement according to claim 2, further comprising using vectors during the search phase to also perform image recognition, wherein the only vectors used to perform image recognition are from the subset.

4. An improvement according to claim 1, wherein identifying component vectors includes obtaining a complete set of eigenvectors for the directory of image examples.

5. An improvement according to claim 4, wherein identifying component vectors includes selecting a subset of basis vectors that correlate negatively with the directory of images, relative to other, unselected basis vectors.

6. An improvement according to claim 4, wherein applying a function includes applying a function to eigenvectors that yields a set of basis vectors and a measure of relative smoothness of each basis vector elative to other basis vectors.

7. An improvement according to claim 4, wherein selecting a subset includes selecting less than fifteen vectors, said improvement further comprising during the search phase, applying the selected vectors to input images as part of an image matching process.

8. An improvement according to claim 4, wherein selecting a subset includes selecting less than fifteen vectors, said improvement further comprising during the search phase, applying the selected vectors to input images as part of an image recognition process.

* * * * *